United States Patent
Kulkarni et al.

(10) Patent No.: US 12,486,424 B2
(45) Date of Patent: Dec. 2, 2025

(54) STRETCHABLE MULTILAYER FILMS

(71) Applicant: EASTMAN CHEMICAL COMPANY, Kingsport, TN (US)

(72) Inventors: Sunil Vilas Kulkarni, Kingsport, TN (US); Thomas Joseph Pecorini, Kingsport, TN (US); Jamie Sue Dziczkowski, Kingsport, TN (US); John Evan Boisseau, Bonita Springs, FL (US); Babatunde Samuel Olaiya, Greensboro, NC (US)

(73) Assignee: Eastman Chemical Company, Kingsport, TN (US)

( * ) Notice: Subject to any disclaimer, the term of this patent is extended or adjusted under 35 U.S.C. 154(b) by 275 days.

(21) Appl. No.: 18/253,899

(22) PCT Filed: Nov. 16, 2021

(86) PCT No.: PCT/US2021/059432
§ 371 (c)(1),
(2) Date: May 22, 2023

(87) PCT Pub. No.: WO2022/115268
PCT Pub. Date: Jun. 2, 2022

(65) Prior Publication Data
US 2024/0018383 A1    Jan. 18, 2024

Related U.S. Application Data

(60) Provisional application No. 63/119,273, filed on Nov. 30, 2020.

(51) Int. Cl.
*C09D 167/02* (2006.01)
*B32B 27/36* (2006.01)
*B32B 27/40* (2006.01)

(52) U.S. Cl.
CPC ............ *C09D 167/02* (2013.01); *B32B 27/36* (2013.01); *B32B 27/40* (2013.01)

(58) Field of Classification Search
CPC .. C09D 167/02; C09D 167/00; C09D 175/04; C09D 175/06; C08G 18/423; C08G 18/7831; C08G 18/7837; C08G 18/792; C08G 63/137; C08J 2375/04; C08J 2475/04; C08J 7/04; C08J 5/18
See application file for complete search history.

(56) References Cited

U.S. PATENT DOCUMENTS

| | | |
|---|---|---|
| 3,044,980 A | 7/1962 | Modic et al. |
| 4,287,109 A | 9/1981 | Schlak et al. |
| 5,883,149 A | 3/1999 | Bennett et al. |
| 8,163,850 B2 | 4/2012 | Marsh et al. |
| 8,168,721 B2 | 5/2012 | Marsh et al. |
| 9,617,390 B2 | 4/2017 | Hinzmann et al. |
| 9,663,622 B2 | 5/2017 | Hinzmann et al. |
| 10,265,932 B2 | 4/2019 | McGuire, Jr. |
| 2013/0072628 A1 | 3/2013 | Crawford et al. |
| 2016/0032139 A1 | 2/2016 | Kikuchi et al. |
| 2018/0105640 A1 | 4/2018 | Zhou et al. |
| 2019/0112502 A1 | 4/2019 | Sloot et al. |
| 2022/0002579 A1 | 1/2022 | Zhou et al. |

FOREIGN PATENT DOCUMENTS

| | | | |
|---|---|---|---|
| WO | WO 2018/001889 A1 | 1/2018 | |
| WO | WO-2020076661 A1 * | 4/2020 | ........... C09D 167/00 |

OTHER PUBLICATIONS

Notification of Transmittal of the International Search Report and the Written Opinion of the International Searching Authority, or the Declaration date of mailing Apr. 7, 2022 received in International Application No. PCT/US2021/059432.
Bayer Material Science, "The Chemistry of Polyurethane Coatings", Technical Publication, 2005, p. 20.

* cited by examiner

*Primary Examiner* — Blaine Copenheaver
(74) *Attorney, Agent, or Firm* — Judith C. Rawls

(57) ABSTRACT

Stretchable, multilayer films are disclosed that include a thermoplastic polyurethane substrate and a thermoset coating, applied to the thermoplastic polyurethane substrate. The thermoset coating may comprise the reaction product of: an oligomeric polyester resin comprising the reaction product of: diols or polyols comprising from about 30 to about 99 mol % trimethylolpropane and from about 1 mol % to about 70 mol % neopentyl glycol, in each case based on the total molar amount of diols and polyols reacted, and dicarboxylic acids or polycarboxylic acids comprising from about 1 mol % to about 70 mol % of one or more cyclic or acyclic aliphatic acids having from 2 to 12 carbons, based on the total molar amount of dicarboxylic acids and polycarboxylic acids reacted.

20 Claims, 1 Drawing Sheet

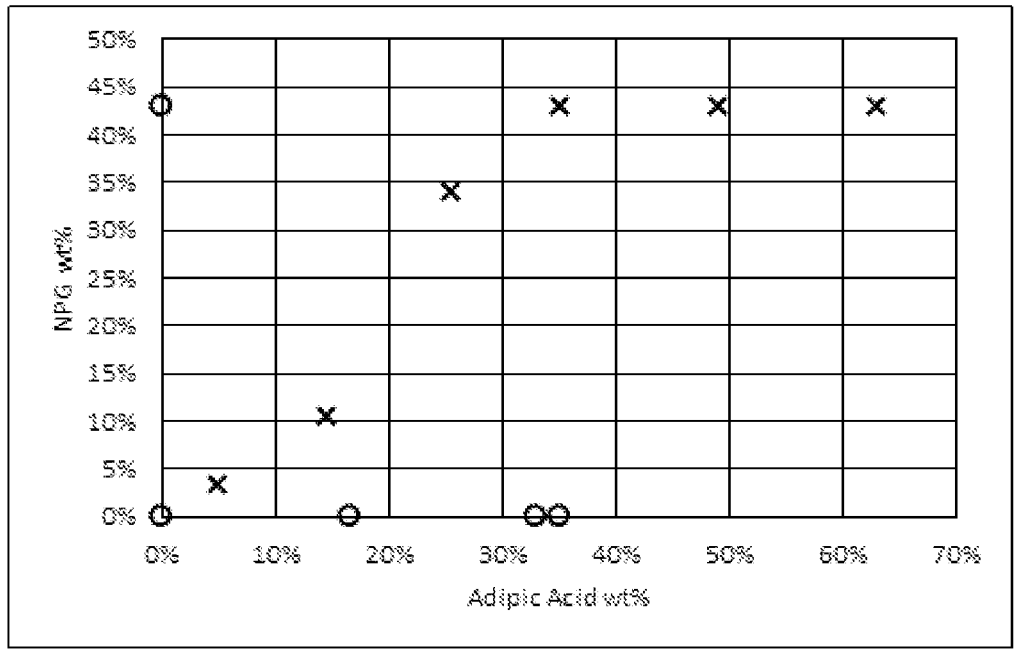
Figure 1 – NPG and Adipic Acid contents in the examples of the invention (X) and comparative examples (O)
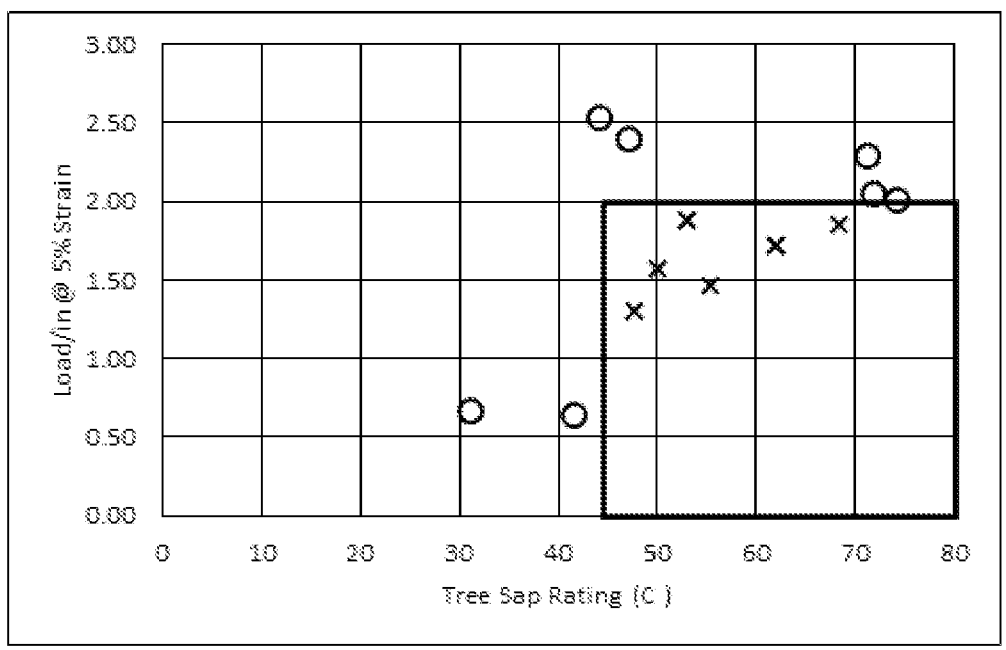
Figure 2 – Tree Sap Resistance and Load/in at 5% strain for the invention (X) and comparative examples (O)

STRETCHABLE MULTILAYER FILMS

CROSS-REFERENCE TO RELATED APPLICATION(S)

This application is a national stage filing under 35 USC § 371 of International Application Number PCT/US2021/059432, filed on, Nov. 16, 2021 which claims the benefit of the filing date to U.S. Provisional Application No. 63/119,273, filed on Nov. 30, 2020, the entire disclosures of which are incorporated by reference herein.

FIELD OF THE INVENTION

The present invention is generally directed to protective films, and especially stretchable multilayer films useful as paint protection films.

BACKGROUND OF THE INVENTION

Stretchable films such as paint protection films used to protect automotive panels, coated wood, and the like, are generally comprised of a thermoplastic elastomer with a thermoset coating applied to one major surface, and an adhesive on the opposing major surface. It is desirable for these protective films to be stretchable to enable conforming to three dimensional objects, as well as resistant to environmental factors such as ultra-violet light, acid rain, tree sap. Resistance to environmental factors is generally provided by this outermost layer of thermoset coating.

U.S. Pat. No. 10,265,932 discloses multi-layer protective sheets that are extensible. They are useful in a range of indoor and outdoor applications in, for example, the transportation, architectural and sporting goods industries. The protective sheets can advantageously be applied to at least a portion of a surface of any article where protection is desired. In one aspect, the extensible multi-layer protective sheets may comprise a carrier layer; and an essentially uncrosslinked topcoat layer. According to a further embodiment of the latter, the topcoat layer can be polyurethane-based.

While paint protection films find a ready market, resistance to environmental factors provided by automotive topcoats on automobile body panels is generally quite good. These topcoats are thermoset, pigment-free clear coats obtained by reacting hydroxyl functional resins with cross-linkers comprising isocyanate. These coatings are engineered to provide desired performance at coating thicknesses of typically around 50-70 microns.

It would be desirable for paint protection films to match the environmental resistance of automotive clear coats. However, the outermost coating for protective films needs to be designed to maintain the stretchability of the underlying thermoplastic elastomeric substrate for application purposes, while clearcoat formulations are rigid. Further, the thickness of protective films, typically 5-15 microns, is much lower than automotive coatings. Due to these design constraints, resistance to environmental factors of protective films is generally inferior to that of automotive coatings.

A continuing need exists to discover a stretchable, multilayer film comprising a protective topcoat and a thermoplastic polyurethane that provides improved tree sap resistance while simultaneously providing an elongation to break of greater than 50% and reducing tensile strength at low strain values.

SUMMARY OF THE INVENTION

In one aspect, the present invention relates to stretchable, multilayer films that include a thermoplastic polyurethane substrate, and a thermoset coating, applied to the thermoplastic polyurethane substrate. The thermoset coating comprises the reaction product of an oligomeric polyester resin and an aliphatic isocyanate or isocyanurate. The oligomeric polyester resin comprises, in turn, the reaction product of: diols or polyols comprising from about 30 to about 99 mol % trimethylolpropane and from about 1 mol % to about 70 mol % neopentyl glycol, in each case based on the total molar amount of diols and polyols reacted; and dicarboxylic acids or polycarboxylic acids comprising from about 1 mol % to about 70 mol % of one or more cyclic or acyclic aliphatic acids having from 2 to 12 carbons, based on the total molar amount of dicarboxylic acids and polycarboxylic acids reacted. The stretchable, multilayer film exhibits an elongation to break of greater than 50%, has a load/inch to stretch of less than 2 lbs/in at 5% strain when measured within a week of multilayer film preparation, and has Tree Sap resistance of greater than 45° C.

In another aspect, the present invention relates to stretchable, multilayer films that include a thermoplastic polyurethane substrate and a thermoset coating, applied to the thermoplastic polyurethane substrate. In this aspect, the thermoset coating is the reaction product of: an aliphatic isocyanate, isocyanurate, allophanate, or biuret reacted with an oligomeric polyester. The oligomeric polyester, in turn, is the reaction product of monomers comprising: trimethylolpropane (TMP) in an amount of 30 to 70 mole %, based on the total moles of a-c, neopentyl glycol (NPG) in an amount of 1 to 70 mole %, based on the total moles of a-c, a diol other than NPG in an amount of 0 to 69 mole %, based on the total moles of a-c, one or more cyclic or acyclic aliphatic acids having from 2 to 12 carbons in an amount of mole %, based on the total moles of d-e, and one or more additional dicarboxylic acids in an amount of 0-70 mole %, based on the total moles of d-e, wherein the oligomeric polyester resin has a glass transition temperature (Tg) of −40 to 55° C., an acid number of 0 to 15 mgKOH/g, a hydroxyl number of 100 to 370 mgKOH/g, a number average molecular weight of 500 to 10,000 mgKOH/g, and a weight average molecular weight of 1000 to 25,000. In this aspect, the stretchable, multilayer films exhibit an elongation to break of greater than 50%, has a load/inch to stretch of less than 2 lbs/in at 5% strain when measured within a week of multilayer film preparation, and has Tree Sap resistance of greater than 45° C.

Further aspects of the invention are as disclosed and claimed herein.

BRIEF DESCRIPTION OF THE DRAWINGS

FIG. 1 graphically depicts NPG (neopentyl glycol) and adipic acid content in the examples of the invention (X) and comparative examples (O).

FIG. 2 graphically depicts tree sap resistance and load/in at 5% strain for the examples of the invention (X) and comparative examples (O).

DETAILED DESCRIPTION

In one aspect, the present invention is directed to stretchable, multilayer films that comprise a thermoplastic elastomeric substrate, for example a thermoplastic polyurethane, coated with a cross-linked, thermoset coating. The thermoset coating is the reaction product of an oligomeric polyester resin comprising, as diols or polyols, from about 30 mol % to about 99 mol % trimethylolpropane (TMP) and from about 1 mol % to about mol % neopentyl glycol (NPG), based on the total molar amount of diols or polyols reacted, or as described elsewhere herein. The oligomeric polyester resins of the invention may comprise other diols or polyols. The oligomeric polyester resins further comprise, as dicarboxylic acids or polycarboxylic acids, from about 1 mol % to about 60 mol % cyclic or acyclic aliphatic dicarboxylic acids having from 1 to 12 carbons, and especially adipic acid, based on the total molar amount of dicarboxylic acids or polycarboxylic acids, or as described elsewhere herein. The oligomeric polyester resins of the invention may comprise other dicarboxylic acids or polycarboxylic acids.

The oligomeric polyester resins of the invention are reacted with an aliphatic isocyanate, isocyanurate, allophanate, or biuret to obtain the thermoset coating. The stretchable, multilayer film may further comprise an adhesive layer, opposite the thermoset coating, for use, for example, as a paint protection film. This adhesive may be a pressure sensitive adhesive. The stretchable multilayer films, including the coating layer, exhibit an elongation to break of greater than 50%, have a load/inch to stretch of less than 2 lbs/in at 5% strain when tested within a week of multilayer film preparation, and have Tree Sap resistance of greater than 45° C., or as further defined herein.

We have discovered, according to the invention, that a stretchable, multilayer film may be formed of a thermoplastic elastomeric substrate provided with a thermoset coating that maintains the integrity of the coating layer when stretched. The thermoplastic, elastomeric substrate, typically a thermoplastic polyurethane, is suitable for use as a paint protection film or an autowrap, and is thus stretchable in an amount, for example, of up to 50% elongation. While thermoplastic polyurethanes are known to be elastomeric in structure, we have surprisingly developed a stretchable multilayer film having a thermoset coating that allows the entire multilayer film to stretch up to 50% elongation to break, has a load/inch to stretch of less than 2 lbs/in at 5% strain when tested within a week of multilayer film preparation, and has tree sap resistance of greater than 45° C. While thermoset coatings similar to those described herein are known to be useful as metal coatings, for example for use on automobiles or as can coatings, they typically do not stretch to any appreciable extent.

For the purposes of this invention, a "stretchable multilayer film" is one that can be reversibly elongated to a strain of at least 50% without cracking. A further aspect of a "stretchable film" is that the force required to reversibly elongate the film is low, as this makes it easier for an installer to conform the film to an automotive surface.

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ diols", is intended to specifically include and disclose $C_1$, $C_2$, $C_3$, $C_4$ and $C_5$ diols.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition "comprising", "containing", "having" or "including" "an" ingredient or "a" polyester is intended to include other ingredients or other polyesters, respectively, in addition to the specifically identified ingredient or residue. Accordingly, the terms "containing", "having" or "including" are intended to be synonymous and may be used interchangeably with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The stretchable, multilayer films of the invention thus comprise a thermoset coating, and a thermoplastic elastomeric substrate on which the thermoset coating is applied. The thermoset coating is made from an oligomeric polyester resin having substantial aliphatic content, comprising residues of trimethylolpropane, neopentyl glycol, and an aliphatic diacid such as adipic acid. The oligomeric polyester resins useful according to the invention may comprise further amounts of diol or polyols, as well as further amounts of dicarboxylic acids or polycarboxylic acids.

The oligomeric polyester resins of the invention are prepared by the polycondensation of one or more acid components and one or more hydroxyl components. These acid components are understood to have at least two carboxylic acid units, and thus are either dicarboxylic acids or polycarboxylic acids, as the case may be. Similarly, these hydroxyl components are understood to have at least two hydroxyl units, and thus are either diols or polyols, as the case may be. As used herein, the word "polyol" describes monomeric units used to construct oligomeric polyester resins and will include monomeric units having two or more hydroxyl groups. Similarly, the word "polycarboxylic acid" as used herein describes monomeric units used to construct oligomeric polyester resins and will include monomeric units having two or more carboxylic acid groups. We will often refer, for convenience, to the terms "diols or polyols" and "dicarboxylic acids or polycarboxylic acids" as the two types of reactants used to form the oligomeric polyester resins of the invention. As used throughout, the molar percentage of each of the diols or polyols is based on the total moles of diols or polyols present. Similarly, the molar percentage of each of the dicarboxylic acids or polycarboxylic acids is based on the total moles of dicarboxylic acids or polycarboxylic acids present.

As used herein, the oligomeric polyester resins of the invention are distinguished from the thermoset coatings that have been reacted with an aliphatic isocyanate, isocyanurate, allophanate, or biuret. The oligomeric polyester resins of the invention are relatively low molecular weight, aliphatic, thermoplastic polyesters that serve as polyol reactants to form the thermoset coatings of the invention when reacted with an aliphatic isocyanate or isocyanurate. Depending on context, the term isocyanate may include isocyanurates, allophanates, or biurets.

The thermoset coatings of the present invention are thus thermoset polymers and are adapted for coating a thermoplastic elastomeric substrate. That is, the oligomeric polyester resins are formulated with aliphatic isocyanates or isocyanurates, optionally with minor amounts of aromatic isocyanates, so that the thermoset coating is suitable for use to protect the thermoplastic elastomeric substrate, while maintaining the desirable stretchability and tree sap resistance. These oligomeric polyester resins thus would not be suitable as stand-alone polymers for fabrication of films, sheets, and other shaped objects by extrusion, casting, blow molding, and other thermoforming processes commonly used for high molecular weight thermoplastic polymers. The oligomeric polyester resins have reactive functional groups, that is hydroxyl groups and/or carboxyl groups, which later react with the aliphatic isocyanate in a coating formulation. The functional groups of the oligomeric polyester resins are controlled by having either excess polyol or polycarboxylic acid in the oligomeric polyester resin composition. The desired crosslinking pathway will determine whether the polyester resin will be hydroxyl-terminated or carboxylic acid-terminated. This concept is known to those skilled in the art and described, for example, in *Organic Coatings Science and Technology,* 2nd ed., p. 246-257, by Z. Wicks, F. Jones, and S. Pappas, Wiley, New York, 1999, the entire disclosure of which is incorporated herein by reference.

The acid components in the oligomeric polyester resin are prepared from dicarboxylic acids and polycarboxylic acids having from 1 to 12 carbon atoms. Typically, the acid components, described herein generically as the polycarboxylic acids, comprise at least one dicarboxylic acid and may, optionally, include polycarboxylic acids. The acid components are essentially aliphatic polycarboxylic acids, although they may comprise minor amounts of aromatic polycarboxylic acids such as isophthalic acid, terephthalic acid, phthalic acid, or residues derived from phthalic anhydride, although this is not preferred. In some aspects, the amount of aromatic acid content may be no more than 5 mol %, or no more than 3 mol %, or no more than 2 mol %, or no more than 1 mol %, or no more than 0.5 mol %, or substantially zero aromatic acid content.

These aliphatic polycarboxylic acids can be further separated into acyclic and cyclic variants. The acyclic aliphatic dicarboxylic acids comprise from 1 to 60 mole %, 1 to 50 mole %, 1 to 40 mole %, 1 to 30 mole %, 1 to 20 mole %, 1 to 10 mole %, 10 to 60 mole %, 10 to 50 mole %, 10 to 40 mole %, 10 to 30 mole %, 10 to 20 mole %, 20 to 60 mole %, 20 to 50 mole %, 20 to 40 mole %, 20 to 30 mole %, 30 to 60 mole %, 30 to 50 mole %, 30 to 40 mole %, 40 to 60 mole %, 40 to 50 mole %, or 50 to 60 mole % based on the total moles of the acyclic aliphatic and cyclic aliphatic diacids.

Acyclic aliphatic acids useful according to the invention thus include oxalic acid, malonic acid, succinic acid, glutaric acid, adipic acid, pimelic acid, suberic acid, undecanedioic acid, maleic acid, fumaric acid, itaconic acid, citraconic acid, dodecanedioic acid, sebacic acid, azelaic acid, acetylene dicarboxylic acid, glutaconic acid, traumatic acid, dimer acid, hydrogenated dimer acid, and the like, or their residues. Adipic acid is a desired acyclic aliphatic acid.

Cyclic aliphatic acids useful according to the invention include 1,4 cyclohexanedicarboxylic acid, 1,3 cyclohexanedicarboxylic acid, hexahydrophthalic anhydride (HHPA), methyl hexahydrophthalic anhydride, tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof, or their residues. HHPA is a desired cyclic aliphatic diacid.

The hydroxyl components in the oligomeric polyester resin are prepared from diols and polyols typically having from 2 to 20 carbon atoms. As noted, the term polyols includes diols, depending on context.

The diols useful according to the invention comprise those having 2 hydroxyl groups that are branched or linear, saturated or unsaturated, aliphatic or cycloaliphatic C2-C20 compounds, the hydroxyl groups being primary, secondary, and/or tertiary, desirably primary. The diols and polyols useful according to the invention thus include 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, and polyethylene glycol, and mixtures thereof, or their residues The polyols useful according to the invention may comprise those having 3 or more hydroxyl groups, saturated or unsaturated, aliphatic or cycloaliphatic C2-C20 compounds, the hydroxyl groups being primary, secondary, and/or tertiary, and desirably at least two of the hydroxyl groups are primary. Desirably, the polyols are hydrocarbons and do not contain atoms other than hydrogen, carbon and oxygen. Examples of these polyols include 1,1,1-trimethylolpropane (TMP), 1,1,1-trimethylolethane, glycerin, pentaerythritol, erythritol, threitol, di-pentaerythritol, sorbitol, and mixtures thereof, or their residues.

In other aspects, the oligomeric polyester resins of the invention may further comprise one or more cycloaliphatic diols, such as, for example, 2,2,4,4-tetramethyl-1,3-cyclobutanediol. In other aspects, the oligomeric polyester resins of the invention may comprise little or no 2,2,4,4-tetramethyl-1,3-cyclobutanediol, for example no more than 15 mol %, or no more than 10 mol %, or no more than 5 mol %, or no more than 2 mol %.

In one aspect, the oligomeric polyester resins of the invention are comprised as monomeric polyols of both trimethylolpropane and neopentyl glycol.

In one aspect, the trimethylolpropane may be present in the oligomeric polyester resin in an amount from about or from 30 to 99 mole %, or from 30 to 80 mole %, or from 30 to 70 mole %, or from 30 to 50 mole %, or from to 40 mole %, or from 40 to 99%, or from 40 to 80 mole %, or from 40 to 70 mole %, or from 40 to 60 mole %, or from 40 to 50 mole %, or from 50 to 99 mole %, or from 50 to 80 mole %, or from 50 to 70 mole %, or from 60 to 99%, or from 60 to 80 mole %, or from 60 to 70 mole %, or from 70 to 99% or from 70 to 80 mole % or from 80 to 99% based on the total moles of TMP and other diols and polyols.

In further aspects, the 2,2-dimethyl-1,3-propanediol (neopentyl glycol) (NPG) in the oligomeric polyester resin comprises from 1 to 70%, or from 10 to 70%, or from 20 to 70 mole %, or from 30 to 70 mole %, or from 40 to 70 mole %, or from 50 to 70 mole %, or from 60 to 70 mole %, from 1 to 60%, or from 10 to 60%, or from 20 to 60 mole %, or from 30 to 60 mole %, or from 40 to 60 mole %, or from 50 to 60 mole %, from 1 to 50%, or from 10 to 50%, or from 20 to 50 mole %, or from 30 to 50 mole %, or from 40 to 50%, or from 1 to 40%, or from 10 to 40%, or from 20 to 40 mole %, or from 30 to 40 mole %, from 1 to 30%, or from 10 to 30%, or from 20 to 30 mole %, or from 1 to 20%, or from 10 to 20%, or from 1 to 10% based on the total moles of NPG and other diols and polyols.

Catalysts may be used to accelerate the rate of the polycondensation reaction to form the in the oligomeric polyester resin.

Additional examples of acid components and hydroxyl components, include those known in the art including, but not limited to, those discussed below, and in various documents known in the art such as, for example, in *Resins for Surface Coatings*, Vol. III, p. 63-167, ed. by P. K. T. Oldring and G. Hayward, SITA Technology, London, U K, 1987, the disclosure of which is incorporated herein by reference.

The term "residue", as used herein in reference to the oligomeric polyester resins of the invention, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid or its associated acid halides, esters, salts, anhydrides, or mixtures thereof. Thus, as used herein, the term "polycarboxylic acid" in its broadest sense is intended to include polycarboxylic acids and any derivative of a polycarboxylic acid, including its associated acid halides, esters, half-esters, salts, half-salts, anhydrides, and mixtures thereof, useful in a polycondensation process with a diol to make a curable, aliphatic polyester.

When we say that a residue is present, we thus mean that it is present as the reaction product of the monomer(s) used. We assume that the amount reacted is the amount present in the reacted material.

The term "aliphatic," is intended to have its common meaning as would be understood by persons having ordinary skill in the art, that is, acyclic or cyclic, saturated or unsaturated carbon compounds, excluding benzenoid or other aromatic systems. The term "cycloaliphatic", or "cyclic aliphatic," as used herein, is intended to mean a cyclic, aliphatic compound. The term "aliphatic polyester", as used herein, is understood to mean a polyester that contains, for example, 90 mole percent or greater aliphatic diacid or diol residues, based on the total moles of diacid or diol residues. Small amounts, such as less than 10 mole %, or less than 9 mole %, or less than 8 mole %, or less than 5 mole %, or less than 3 mole %, or less than 2 mole %, or less than 1 mole % of aromatic dicarboxylic acids residues or aromatic diol residues also may be present in the curable, aliphatic polyester. Desirably, the curable, aliphatic oligomeric polyester resin, is essentially free, i.e., having less than 1 mole % of aromatic diacid and/or aromatic diol residues.

Tree sap is an aggressive agent that is known to damage car paint over a period of time. Resistance to tree sap in coatings is achieved typically by increasing crosslinking density and glass transition temperature of the coatings, both of which we have found to adversely affect stretchability, which of course is a highly desirable feature of the protective films of the invention. It is thus highly desirable for paint protection film to achieve good resistance to tree sap while maintaining required stretchability.

Thus, in various embodiments, this invention provides a thermoset coating applied to the thermoplastic elastomeric substrate of the invention that is made from an oligomeric polyester resin to obtain the inventive stretchable, multilayer films. In one aspect, the films of the invention exhibit a tree sap resistance greater than 45° C., or greater than 50° C., or greater than or greater than 70° C., as determined by the method described herein.

In another aspect, the stretchable, multilayer films of the invention exhibit an elongation to break of greater than 50%, or greater than 60%, or greater than 65%, as determined by the method described herein.

In a further aspect, the stretchable, multilayer films of the invention exhibit a tensile strength at 5% strain of less than 2% when the coating has a thickness of about from 0.1 to 25 microns, or from 0.1 to 20 microns, or from 0.1 to 15 microns, or from 0.1 to 10 microns, or from 0.5 to 25 microns, or from 0.5 to 20 microns, or from 0.5 to 15 microns, or from 0.5 to 10 microns, or from 1 to 25 microns, or from 1 to 20 microns, or from 1 to 15 microns, or from 1 to 10 microns, or from 1 to 5 microns, or from 2 to 25 microns, or from 2 to 20 microns, or from 2 to 15 microns, or from 2 to 10 microns, or from 3 to 8 microns, in each case as determined by the method described herein.

The hydroxyl number of the oligomeric polyester resins of the present invention is from about 100 to about 370, or from 125 to 300, or from 150 to 300, or from 170 to 330, or from 180 to 280, or from 190 to 240 mg KOH/g of polyester, and an acid number of 0 to 15 mg KOH/g, or from 1 to 10 mg KOH/g.

The number average molecular weight (Mn) of the oligomeric polyester resins of the present invention may be from about 500 to about or from 800 to 6,000, or from 1,000 to 4,000 g/mole. The weight average molecular weight (Mw) of the curable oligomeric polyester resins of the present invention may be from about 1,000 to about 40,000, from 1,000 to 25,000, or from 2,000 to 20,000 g/mole. Molecular weights are measured by gel permeation chromatography (GPC) using polystyrene equivalent molecular weight and tetrahydrofuran (THF) as solvent In other aspects, the Mw molecular weight may be at least about 1,000, or at least 1,500, or at least 2,000, up to about 20,000, or up to about 21,000, or up to 22,000, or up to about 24,000, or up to about 25,000, or up to about 40,000.

The glass transition temperature (Tg) of the oligomeric polyester resins of the present invention may be from −40° C. to 55° C., from −30° C. to 25° C., or from −10° C. to 10° C.

The isocyanate crosslinker of the thermoset coating is desirably an aliphatic isocyanate or aliphatic polymeric isocyanate type. Suitable isocyanates include, but are not limited to, methylenebis-4,4'-isocyanatocyclohexane, isophorone diisocyanate, isophorone diisocyanate, 1,6-hexamethylene diisocyanate, 1,4-cyclohexane diisocyanate, pentane-1,5-diisocyanate, 1,4-bis(isocyanatomethyl) cyclohexane. The isocyanate crosslinker of the thermoset coating also includes polymeric isocyanates of the monomeric isocyanates listed above, This includes, but is not limited to isocyanurates, allophanates, and biurets. There can also be employed isocyanate terminated adducts of diols and polyols, such as ethylene glycol, 1,4-butylene glycol, trimethylol propane, etc. These are formed by reacting more than one mole of a diisocyanate, such as those mentioned, with one mole of a diol or polyol to form a higher molecular weight isocyanate prepolymer with a functionality of 2 to 3. Examples include those isocyanate crosslinkers under the Desmodur and Mondur trade names from Covestro LLC. Where isocyanates are used as crosslinkers, it is preferred to use aliphatic isocyanates, since they provide better outdoor durability and color stability in the cured coating. Examples include 1,6-hexamethylene diisocyanate, 1,4-butylene diisocyanate, methylene bis (4-cyclohexyl isocyanate) and isophorone diisocyanate. Mixtures of isocyanate crosslinkers can also be employed. The desirable isocyanate crosslinkers also include modified isocyanates, for example, carbodiimide modified isocyanates, silane modified isocyanates, and blocked isocyanates.

Generic structures of the building blocks for the desirable isocyanate are shown below.

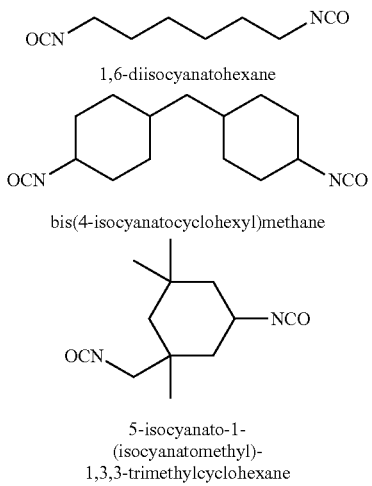

1,6-diisocyanatohexane bis(4-isocyanatocyclohexyl)methane 5-isocyanato-1-(isocyanatomethyl)-1,3,3-trimethylcyclohexane As used herein, an allophanate is the reaction product of an isocyanate disclosed herein and a urethane. Biuret is a reaction product of two or more isocyanates as disclosed herein.

The minor amounts of aromatic isocyanate may include Toluene diisocyanate, methylene diphenyl isocyanate as well as polymeric allophanates, isocyanurates, and biurets of these materials.

The thermoset coating compositions of the invention may further contain one or more other crosslinkers known in the art that could react with hydroxyl groups or residual acid groups of the inventive polyesters. One example is melamine or "amino" type crosslinkers that can react with hydroxyl groups. Another example is epoxides that could react with residual acid groups.

Stoichiometric calculations for the polyester resin and isocyanate reaction are known to those skilled in the art and are described in The Chemistry of Polyurethane Coatings, Technical Publication p. 20, by Bayer Material Science, 2005, incorporated herein by reference. Theoretically, cross-linking between the polyester resin and isocyanate reaches maximum molecular weight and optimal properties associated with molecular weight when one equivalent of isocyanate (NCO) reacts with one equivalent of hydroxyl (OH), which is when the NCO to OH ratio is 1.0/1.0. It is common practice to use a small excess of isocyanate, about 5-10%, to allow for the likely consumption of isocyanate by moisture from the atmosphere, solvents and pigments. It is sometimes desirable to vary the NCO to OH ratio less than 1.0/1.0 to improve flexibility or greater than 1.0/1.0 for harder, more chemical resistant and more weather resistant coatings.

In a preferred embodiment, NCO to OH ratio may be from 0.7 to 1.3, or from 0.75 to 1.25, or from 0.8 to 1.2, or from 0.85 to 1.15, or from 0.9 to 1.1, or from 0.95 to 1.05.

In another aspect, this invention further provides a thermoset coating composition that may further comprise one or more cross-linking catalysts. Useful catalysts may include tertiary amines, such as triethylene diamine, N-methyl morpholine, N-ethyl morpholine, diethyl ethanolamine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propylamine, N,N-dimethyl benzyl amine, dicyclohexylmethylamine, 2,4,6-tris dimethylaminomethylphenol, N,N-dimethyl cyclohexylamine, triethylamine, tri-n-butylamine, I,8-diazabichloro[5,40]-undecene-7 N-methyl diethanolamine, N,N-dimethyl ethanolamine, N,N-diethyl cyclohexylamine, N,N,N'N'-tetramethyl-ethylene diamine, I,4-diaza-bicyclo-[2,2, 2]-octane N-methyl-N-dimethylaminoethyl-piperazine, bis-(N,N-diethylaminoethyl)-adipate, N,N-diethylbenzylamine, pentamethyldiethylene triamine, N,N,N',N'-tetramethyl-I,3-butanediamine, 1,2-dimethylimidazole, 2-methylimidazole; tin compounds, such as stannous chloride, dibutyl tin di-2-ethyl hexoate, stannous octoate, dibutyl tin dilaurate, trimethyl tin hydroxide, dimethyl tin dichloride, dibutyl tin diacetate, dibutyl tin oxide, tributyl tin acetate, tetramethyl tin, dimethyl dioctyl tin, tin ethyl hexoate, tin laurate, dibutyl tin maleate, dioctyl tin diacetate; other metal organics, such as zinc octoate, phenyl mercuric propionate, lead octoate, lead naphthenate, and copper naphthenate. Particularly useful, for the present invention, is dibutyl tin dilaurate (DBTDL). Useful amounts of catalyst will be about 0.01 to 5%, based on the total weight of the resin solids.

The thermoset coating composition may also contain one or more leveling, rheology, and flow control agents such as silicones, fluorocarbons or cellulosics; wetting agents; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewicides; corrosion inhibitors; thickening agents; flow agents; rheology control agents; slip agents; oleophobic agents; superhydrophobic agents; or coalescing agents. Specific examples of such additives can be found in Raw Materials Index, published by the National Paint & Coatings Association, 1500 Rhode Island Avenue, N.W., Washington, D.C. 20005.

In some useful embodiments, the thermoset coating compositions described herein may include a flattening agent. Flattening agents are generally small solid particles of material that are insoluble in water and are effective to reduce gloss. Preferably, the flattening agent particles have a size of from about 0.05 to about 10 microns but may be present in clumps or agglomerates of up to about 50 microns. The flattening agent particles may be inorganic or organic. Examples of suitable inorganic flattening agents include silicates, such as talc, and various forms of silica, such as amorphous, aerogel, diatomaceous, hydrogel and fumed silicas. Examples of suitable organic flattening agents include insoluble urea-formaldehyde resins, polyethylene, polypropylene, cellulosic fibers and polyurethane/polyurea copolymers.

Some examples of UV absorbers and UV light stabilizers are substituted benzophenone, substituted benzotriazoles, hindered amines, and hindered benzoates, available from Cytec Specialty Chemicals as CYASORB® UV, and available from Ciba Specialty Chemicals as TINUVIN®; diethyl-3acetyl-4-hydroxy-benzyl-phosphonate, 4-dodecyloxy-2-hydroxy benzophenone, and resorcinol monobenzoate.

If desired, the thermoset coating compositions can comprise other functional materials such as dye colorants, pigments, abrasion resistant particles (like NANOBYK™ additives from BYK Chemie), anti-oxidants, thixotropic agents, and fillers. Examples of pigments include those generally recognized by persons of ordinary skill in the art of surface coatings. For example, the pigment may be a typical organic or inorganic pigment, especially those set forth in the Colour Index, 3rd ed., 2nd Rev., 1982, published by the Society of Dyers and Colourists in association with the American Association of Textile Chemists and Colorists. Other examples of suitable pigments include titanium dioxide, barytes, clay, calcium carbonate, CI Pigment White 6 (titanium dioxide), CI Pigment Black 7, CI Pigment Black 11, CI Pigment Black 22, CI Pigment Black 27, CI Pigment Black 28, CI Pigment Red 101 (red iron oxide), CI Pigment Yellow 42, CI Pigment Blue 15, 15:1, 15:2, 15:3, 15:4 (copper phthalocyanines); CI Pigment Red 49:1 and CI Pigment Red 57:1. Colorants such as, for example, phthalocyanine blue, molybdate orange, or carbon black also may be added to the thermoset coating composition.

The thermoset coating compositions of the invention may further comprise a hydrophobicity-enhancing additive, for example a monofunctional silicone component provided with a hydroxyl, amino, or epoxy functionality. If a monofunctional material is used, it may serve as a chain-terminating agent during polymerization, or cross-linking.

The additive may thus be one or more of monoglycidyl ether terminated poly(dimethylsiloxane), dig lycidyl ether terminated poly(dimethylsiloxane), bis(3-aminopropyl) terminated poly(dimethylsiloxane) (DMS-A11 available from Gelest), (aminopropylmethylsiloxane)-dimethylsiloxane copolymer (e.g. AMS-132, AMS-152, AMS-162, AMS-163, AMS-191, or AMS-1203 available from Gelest), (aminoethylaminopropylmethylsioxane)-dimethylsiloxane copolymer (e.g. AMS-2202, AMS-233, or AMS-242 available from Gelest), monohydroxyl terminated polydimethylsiloxane (e.g. MCS-C11, MCR-C12, MCR-C18, MCR-C22, or MCS-C13 available from Gelest), hydroxyl terminated polydimethylsiloxane (e.g. DMS-C15 or DMS-C16 available from Gelest), and silanol terminated polydimethylsiloxane (e.g. DMS-S12 available from Gelest).

Any solvent that will enable the formulation to be coated on a substrate may be used, and these will be well known to the person skilled in the art. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The amount of organic solvent can be up to 60 wt. % based on the total weight of the thermoset coating composition.

Examples of dispersing agents include, but are not limited to, sodium bis(tridecyl) sulfosuccinate, di(2-ethyl hexyl) sodium sulfosuccinate, sodium dihexylsulfosuccinate, sodium dicyclohexyl sulfosuccinate, diamyl sodium sulfosuccinate, sodium dusobutyl sulfosuccinate, disodium isodecyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine salts of an unsaturated fatty acid, all available from BYK Chemie USA as ANTI TERRA™. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK™, available from Buckman Laboratories Inc., BYK™, available from BYK Chemie, U.S.A., FOAMASTER™ and NOPCO™, available from Henkel Corporation Coating Chemicals, DREWPLUS™, available from the Drew Industrial Division of Ashland Chemical Company, TROYSOL™ and TROYKYD™, available from Troy Chemical Corporation, and SAG™, available from Union Carbide Corporation.

Some examples of UV absorbers and UV light stabilizers are substituted benzophenone, substituted benzotriazoles, hindered amines, and hindered benzoates, available from Cytec Specialty Chemicals as CYASORB® UV, and available from Ciba Specialty Chemicals as TINUVIN®; diethyl-3acetyl-4-hydroxy-benzyl-phosphonate, 4-dodecyloxy-2-hydroxy benzophenone, and resorcinol monobenzoate.

As used herein, the thermoplastic elastomeric substrate may comprise a number of thermoplastic elastomers, such as polyurethanes, styrenic block copolymers, polyacrylates, polyolefins, vinyl chloride polymers, polyether-esters, polyamides, ionomers, silicones, and fluoropolymers. The thermoplastic elastomeric substrates of the invention are characterized in part by their elasticity.

In one aspect, the thermoplastic elastomeric substrates comprise thermoplastic polyurethanes, or TPUs. TPUs can be divided into three chemical classes: polyester-based, polyether-based, and polycaprolactone-based. Polyester TPUs are generally compatible with PVC and other polar plastics and provide excellent abrasion resistance, offer a good balance of physical properties and are useful in polymer blends. Polyether-based TPUs offer lower temperature flexibility and good abrasion and tear resistance. They also have good hydrolytic stability. Polycaprolactone-based TPUs have the inherent toughness and resistance of polyester-based TPU's and good low temperature performance and hydrolytic stability.

TPUs can also be subdivided into aromatic and aliphatic TPUs, in this case referring to the diisocyanates used. Aromatic TPU's based on isocyanates like toluene diisocyanate (TDI) and methylene diphenyl diisocyanate (MDI) are the majority of TPU's and are used when strength, flexibility, and toughness are required. However, they typically do not weather well. Aliphatic TPUs based on isocyanates like (4,4'-Methylene dicyclohexyl diisocyanate (H12 MDI), hexamethylene diisocyanate (HDI) and isophorone diisocyanate (IPDI) are light stable and offer excellent clarity. They are commonly used in automotive interior and exterior applications and may be used to bond safety glass together. We have found that aliphatic polycaprolactone-based TPU's offer a good balance of weatherability, low temperature flexibility, and impact resistance needed for many automotive exterior applications, and are especially useful according to the invention.

In a specific aspect, the thermoplastic polyurethanes useful according to the invention as thermoplastic elastomeric substrate may be aliphatic polycaprolactone-based thermoplastic polyurethanes, comprised of a polycaprolactone-based polymeric diol reacted with an aliphatic diisocyanate. In this aspect, the aliphatic diisocyanate may be selected from, for example, (4,4'-Methylene dicyclohexyl diisocyanate (H12 MDI or HMDI), hexamethylene diisocyanate (HDI), and isophorone diisocyanate (IPDI). In this aspect, the polycaprolactone-based polymeric diol is comprised of caprolactone units, a glycol such as ethylene glycol, propylene glycol, neopentyl glycol, or butanediol, and may be initiated by a glycol such as ethylene glycol, diethylene glycol, hexanediol, neopentyl glycol or butane diol. In a preferred aspect, the thermoplastic polyurethane comprises residues of HMDI, 1,4-butanediol, and caprolactone. The polycaprolactone-based polymeric diol used to form the thermoplastic polyurethanes of the invention may have a molecular weight, for example, from about 500 to about 5000, or from about 800 to about 4000, or from about 900 to about 3000, or from about 1000 to about 2500.

Other properties of the aliphatic polycaprolactone-based thermoplastic polyurethanes include the inherent toughness and resistance of polyester-based TPUs and good low temperature performance, good weatherability and light fastness and hydrolytic stability.

TPUs useful according to the invention as thermoplastic elastomeric substrates include those disclosed and claimed in U.S. Pat. No. 10,265,932, the disclosure of which is incorporated herein by reference. They are polymers containing urethane (also known as carbamate) linkages, urea linkages, or combinations thereof (i.e., in the case of poly (urethane-urea)s). Thus, polyurethanes useful according to the invention contain at least urethane linkages and, optionally, urea linkages. In one aspect, polyurethane-based layers of the invention are based on polyurethanes where the backbone has at least about 80% urethane and/or urea repeat linkages formed during their polymerization.

TPUs useful according to the invention as thermoplastic elastomeric substrates can include polyurethane polymers of the same or different chemistries, that is, polymer blends. Polyurethanes generally comprise the reaction product of at least one isocyanate-reactive component, at least one isocyanate-functional component, and one or more optional components such as emulsifiers and chain extending agents.

Isocyanate-reactive components useful according to the invention in the TPUs include at least one active hydrogen, such as amines, thiols, and polymeric diols, and especially hydroxyl-functional materials such as polymeric diols that provide urethane linkages when reacted with the isocyanate-functional component. Specific polymeric diols of interest include polyester polymeric diols (e.g., lactone polymeric diols) and alkylene oxide adducts thereof (e.g., ethylene oxide; 1,2-epoxypropane; 1,2-epoxybutane; 2,3-epoxybutane; isobutylene oxide; and epichlorohydrin), polyether polymeric diols (e.g., polyoxyalkylene polymeric diols, such as polypropylene oxide polymeric diols, polyethylene oxide polymeric diols, polypropylene oxide polyethylene oxide copolymer polymeric diols, and polyoxytetramethylene polymeric diols; polyoxycycloalkylene polymeric diols; polythioethers; and alkylene oxide adducts thereof), polyalkylene polymeric diols, polycarbonate polymeric diols, mixtures thereof, and copolymers thereof. Further polymeric diols of interest are those derived from caprolactone, referred to herein as polycaprolactone-based polymeric diols.

The isocyanate-reactive component of the thermoplastic elastomeric substrates of the invention is thus reacted with an isocyanate-functional component to form the TPU. The isocyanate-functional component may contain one isocyanate-functional material or mixtures thereof. Polyisocyanates, including derivatives thereof (e.g., ureas, biurets, allophanates, dimers and trimers of polyisocyanates, and mixtures thereof), (hereinafter collectively referred to as "polyisocyanates") are preferred isocyanate-functional materials for the isocyanate-functional component. Polyisocyanates have at least two isocyanate-functional groups and provide urethane linkages when reacted with the hydroxy-functional isocyanate-reactive components. In one embodiment, polyisocyanates useful for preparing polyurethanes are one or a combination of any of the aliphatic or optionally aromatic polyisocyanates used to prepare polyurethanes.

The isocyanates of the TPUs are typically diisocyanates, and include aromatic diisocyanates, aromatic-aliphatic diisocyanates, aliphatic diisocyanates, cycloaliphatic diisocyanates, and other compounds terminated by two isocyanate-functional groups (e.g., the diurethane of toluene-2,4-diisocyanate-terminated polypropylene oxide polymeric diol). Diisocyanates useful according to the invention thus include: 2,6-toluene diisocyanate; 2,5-toluene diisocyanate; 2,4-toluene diisocyanate; phenylene diisocyanate; 5-chloro-2,4-toluene diisocyanate; 1-chloromethyl-2,4-diisocyanato benzene; xylylene diisocyanate; tetramethyl-xylylene diisocyanate; 1,4-diisocyanatobutane; 1,6-diisocyanatohexane; 1,12-diisocyanatododecane; 2-methyl-1,5-diisocyanatopentane; methylenedicyclohexylene-4,4'-diisocyanate; 3-isocyanatomethyl-3,5,5'-trimethylcyclohexyl isocyanate (isophorone diisocyanate); 2,2,4-trimethylhexyl diisocyanate; cyclohexylene-1,4-diisocyanate; hexamethylene-1,6-diisocyanate; tetramethylene-1,4-diisocyanate; cyclohexane-1,4-diisocyanate; naphthalene-1,5-diisocyanate; diphenylmethane-4,4'-diisocyanate; hexahydro xylylene diisocyanate; 1,4-benzene diisocyanate; 3,3'-dimethoxy-4,4'-diphenyl diisocyanate; phenylene diisocyanate; isophorone diisocyanate; polymethylene polyphenyl isocyanate; 4,4'-biphenylene diisocyanate; 4-isocyanatocyclohexyl-4'-isocyanatophenyl methane; and p-isocyanatomethyl phenyl isocyanate.

The components of these polyurethanes are further described below with reference to specific hydrocarbon groups, and to polymeric versions thereof. The prefix "poly" is thus added to the corresponding hydrocarbon group. The hydrocarbon groups may include one or more heteroatoms in addition to carbon, and may also contain functional groups such as oximes, esters, carbonates, amides, imides, ethers, urethanes, ureas, carbonyls, or mixtures thereof.

In one aspect, the TPUs useful according to the invention as thermoplastic elastomeric substrates include those made from aliphatic isocyanates and oligomeric polyester resins. The term "aliphatic" means a saturated or unsaturated, linear, branched, or cyclic hydrocarbon group. This term includes alkylene (e.g., oxyalkylene), aralkylene, and cyclo alkylene groups. The term "alkylene group" means a saturated, linear or branched, divalent hydrocarbon group. Preferred alkylene groups include oxyalkylene groups, which are saturated, linear or branched, divalent hydrocarbon groups with a terminal oxygen atom. "Aralkylene groups" are saturated, linear or branched, divalent hydrocarbon groups having at least one aromatic group. The term "cycloalkylene group" means a saturated, linear or branched, divalent hydrocarbon group with at least one cyclic group. The term "oxycycloalkylene group" means a saturated, linear or branched, divalent hydrocarbon group having at least one cyclic group and a terminal oxygen atom. The term "aromatic group" means a mononuclear aromatic hydrocarbon group or polynuclear aromatic hydrocarbon group. This term includes arylene groups. The term "arylene group" means a divalent aromatic group.

Aliphatic isocyanates useful in the thermoplastic elastomeric substrates according to the invention thus include aliphatic groups that may be alkyl groups, alkenyl groups, alkynyl groups, and the like, and may be branched or linear, with linear being advantageous. The aliphatic group may comprise from 2-30 carbon atoms, or from 3-12 carbon atoms, or from 4-10 carbon atoms. Examples include 1,12-diisocyanatododecane; 2-methyl-1,5-diisocyanatopentane; methylenedicyclohexylene-4,4'-diisocyanate; 3-isocyanatomethyl-3,5,5'-trimethylcyclohexyl isocyanate (isophorone diisocyanate); 2,2,4-trimethylhexyl diisocyanate; cyclohexylene-1,4-diisocyanate; hexamethylene-1,6-diisocyanate; tetramethylene-1,4-diisocyanate; cyclohexane-1,4-diisocyanate; and isophorone diisocyanate.

One or more chain extenders can also be used in preparing the thermoplastic elastomeric substrates of the invention. For example, such chain extenders can be any or a combination of the aliphatic polymeric diols, aliphatic polyamines, or aromatic polyamines used to prepare polyurethanes. Chain extenders useful according to the invention thus include the following: 1,4-butanediol; propylene glycol; ethylene glycol; 1,6-hexanediol; glycerin; trimethylolpropane; pentaerythritol; 1,4-cyclohexane dimethanol; and phenyl diethanolamine. Also note that diols such as hydroquinone bis(p-hydroxyethyl)ether; tetrachlorohydroquinone-1, 4-bis(p-hydroxyethyl)ether; and tetrachlorohydroquinone-1, 4-bis(p-hydroxyethyl)sulfide, even though they contain aromatic rings, are considered to be aliphatic polymeric diols for purposes of the invention. Aliphatic diols of 2-10 carbon atoms are preferred. Especially preferred is 1,4-butanediol.

According to the invention, the stretchable, multilayer films of the invention exhibit improved balance of tree sap resistance and stretchability. In various embodiments, the stretchable, multilayer films of the invention have tree sap resistance of greater than 45° C., determined as described below, and exhibits a elongation to break of greater than 50%, and has a load/inch to stretch of less than 2 lbs/in at 5% strain when tested within a week of multilayer film preparation, determined as described below.

The stretchable, multilayer films of the invention may further comprise a pressure sensitive adhesive (PSA), provided to assist in mounting the films to the surface to which they are to be adhered. These pressure sensitive adhesives may be applied, for example, by means of a release liner, or may be coated onto the thermoplastic elastomeric substrates. Pressure sensitive adhesives useful according to the invention include those disclosed in U.S. Pat. No. 5,883,149, the disclosure of which is incorporated herein by reference in its entirety.

The PSAs useful according to the invention include acrylate pressure sensitive adhesives that include acrylic polymers that may be characterized by their glass transition temperature (Tg). The Tg of the polymer may be from about −55° C. to about 15° C., or from −30° C. to 5° C., or from −25° C. to 0° C. The adhesives according to the invention may comprise from about 25 to about 98 parts, or from 60 to 95 parts, of an acrylic acid ester whose homopolymer has a Tg less than 0° C., or especially less than −20° C.; from about 2 to about 75 parts, or from 5 to 45 parts of an ethylenically unsaturated monomer whose homopolymer has a Tg greater than 0° C., or greater than 10° C.; from 0 to about 15 parts, or from 0 to 10 parts, of an acid- or hydroxyl-bearing polar ethylenically unsaturated monomer. Optionally the adhesive polymer may be blended with a tackifier from 0 to about 50 parts, or from 10 to parts.

The acrylic acid esters that are useful according to the invention are monofunctional acrylic esters of monohydric alcohols having from about 4 to about 18 carbon atoms in the alcohol moiety, whose homopolymer has a Tg less than 0° C. Included in this class of acrylic acid esters are isooctyl acrylate, 2-ethylhexyl acrylate, isononyl acrylate, isodecyl acrylate, decyl acrylate, lauryl acrylate, hexyl acrylate, butyl acrylate, and octadecyl acrylate, or combinations thereof. In the case of octadecyl acrylate, the amount is chosen such that side chain crystallization does not occur at room temperature.

Examples of ethylenically unsaturated monomers whose homopolymer has a Tg greater than 0° C., or greater than 10° C., include, but are not limited to, 3,3,5 trimethylcyclohexyl acrylate, cyclohexyl acrylate, isobornyl acrylate, N-octyl acrylamide, t-butyl acrylate, methyl methacrylate, ethyl methacrylate, propyl methacrylate, N,N dimethylacrylamide, N-vinyl-2-pyrrolidone, N-vinyl caprolactam, acrylonitrile, tetrahydrofurfuryl acrylate, glycidyl acrylate, 2-phenoxyethylacrylate, and benzylacrylate or combinations thereof.

Acid or hydroxyl bearing monomers useful according to the invention include, but are not limited to, acrylic acid, methacrylic acid, methyl acrylate, betacarboxyethyl acrylate, hydroxyethyl acrylate, hydroxyethyl methacrylate, hydroxypropyl acrylate, hydroxypropyl methacrylate, hydroxybutyl acrylate, and hydroxybutyl methacrylate.

These adhesive polymers will optionally include a crosslinker including, but not limited, to metal chelates like aluminum acetylacetonate, and various titanates. Other crosslinkers include, but are not limited to, multifunctional epoxies, silanes, aziridines, isocyanates and/or (meth)acrylates. Optionally the PSA could also include other additives such as tackifiers, plasticizers, UV absorbers/stabilizers, and antioxidants.

While the composition of the present invention has been described above in detail with respect to two exemplary embodiments with two end-use utilities, it will be understood by the person of ordinary skill that the composition of the present invention may be utilized in a wide variety of end-use applications and may include the chelating agent in any amount desired to achieve desired performance in those applications. For example, the compositions of the present invention may be useful in other cleaning applications, for example upholstery cleaners, carpet cleaners, hard surface cleaners as well as utilities such as water treatment, pulp and paper manufacturing and agrochemical processing.

The following examples set forth suitable and/or preferred methods and results in accordance with the invention. It is to be understood, however, that these examples are provided by way of illustration and nothing therein should be taken as a limitation upon the overall scope of the invention. All percentages are by weight unless otherwise specified.

EXAMPLES

Preparation of Oligomeric Polyester Resins

The oligomeric polyester resins (Table 1) were prepared according to the following procedures. All of the resins were prepared in a two-liter reaction kettle equipped with a heating mantle, mechanical stirrer, thermocouple, nitrogen blanket, oil-heated partial condenser, condensate trap, and water-cooled total condenser.

Oligomeric Polyester Resin 1 (PE1)

Stage 1—HHPA, TMCD, triphenylphosphite and xylene were charged to the reaction kettle. Additional xylene was used to fill the condensate trap. The temperature was then increased from room temperature to 140° C. over fifty minutes. Agitation was started when the melt reached 100° C. The temperature was held at 140° C. until an acid number ≤242 mg KOH/g resin was achieved.

Stage 2—NPG, half of total TMP, AD and Fascat 4100 catalyst were added to the reactor and heated to 230° C. over six hours.

Stage 3—Remaining TMP was added and the reaction was held at 230° C. until a final acid number of 8 mg KOH/g resin, was achieved. The resin was cooled to 190° C. and poured through a medium mesh paint filter into a metal paint can.

Oligomeric Polyester Resin 2 (PE2)

Stage 1—HHPA, NPG, and triphenylphosphite were charged to the reaction kettle. Additional xylene was used to fill the condensate trap. The temperature was then increased from room temperature to 140° C. over fifty minutes. Agitation was started when the melt reached 75° C. The temperature was held at 190° C. until an acid number 193 mg KOH/g resin was achieved. The temperature was then cooled to 165° C.

Stage 2—Half of the total TMP, AD, and catalyst were added to the reactor and then heated to 140° C. and held overnight. The reaction was then heated to 230° C. over six hours.

Stage 3—Remaining TMP was added to the reactor and the reaction was held at 230° C. until a final acid number of 8 mg KOH/g resin, was achieved. The resin was cooled to 190° C. and poured through a medium mesh paint filter into a metal paint can.

Oligomeric Polyester Resin 3 (PE3)

Stage 1—HHPA, NPG and triphenylphosphite were charged to the reaction kettle. Additional xylene was used to fill the condensate trap. The temperature was increased from room temperature to 100° C. over one hour. Agitation was started when the melt reached 100° C. The temperature was held at 130° C. until an acid number 272 mg KOH/g resin was achieved.

Stage 2—TMP and Fascat 4100 catalyst were added to the reactor and heated to 230° C. over four hours. The reaction was held at 230° C. until a final acid number of 2 mg KOH/g resin was achieved. The resin was then cooled to 190° C. and poured through a medium mesh paint filter into a metal paint can.

Oligomeric Polyester Resin 4 (PE4)

Stage 1—HHPA, TMCD, triphenylphosphite and xylene were charged to the reaction kettle. Additional xylene was used to fill the condensate trap. The temperature was increased from room temperature to 100° C. over one hour. Agitation was started when the melt reached 100° C. The temperature was held at 140° C. until an acid number 376 mg KOH/g resin was achieved.

Stage 2—NPG, half of total TMP, adipic and Fascat 4100 catalyst were added to the reactor and heated to 230° C. over six hours.

Stage 3—Remaining TMP was added. The reaction was held at 230° C. until a final acid number of 5 mg KOH/g resin was achieved. The resin was then cooled to 190° C. and poured through a medium mesh paint filter into a metal paint can.

Oligomeric Polyester Resin 5 (PE5)

Stage 1—HHPA, TMCD, adipic, triphenylphosphite and Fascat 4100 catalyst were charged to the reaction kettle. The temperature was increased from room temperature to 100° C. over one hour. Agitation was started when the melt reached 100° C. The temperature was held at 200° C. until an acid number 283 mg KOH/g resin was achieved.

Stage 2—TMP and catalyst was added and the reaction was heated to 150° C. Temperature was increased to 225° C. over four hours and was held at that temperature until a final acid number of 2 mg KOH/g resin was achieved. The resin was then cooled to 170° C. and poured through a medium mesh paint filter into a metal paint can.

Oligomeric Polyester Resin 6 (PE6)

Stage 1—HHPA, TMCD, TMP, adipic acid, triphenylphosphite and xylene were charged to the reaction kettle. Additional xylene was used to fill the condensate trap. The temperature was increased from room temperature to 100° C. over one hour. Agitation was started when the melt reached 100° C. The temperature was held at 195° C. until an acid number 245 mg KOH/g resin was achieved.

Stage 2—NPG, TMP, and Fascat 4100 catalyst were added and the reaction was heated to 150° C. Temperature was increased to 230° C. over four hours and was held at that temperature until a final acid number of 8 mg KOH/g resin was achieved. The resin was then cooled to 190° C. and poured through a medium mesh paint filter into a metal paint can.

Oligomeric Polyester Resin 7 (PE7)

Stage 1—NPG, TMCD, half of the total TMP, AD, Fascat 4100 catalyst, triphenylphosphite and xylene were charged to the reaction kettle. Additional xylene was used to fill the condensate trap. The temperature was increased from room temperature to 100° C. over one hour. Agitation was started when the melt reached 100° C. The temperature was held at 220° C. over two hours and held until half of the water of esterification was obtained.

Stage 2—Remaining TMP was added and the temperature was held at 220° C. until a final acid number of 4 mg KOH/g resin was achieved. The resin was then cooled to 190° C. and poured through a medium mesh paint filter into a metal paint can.

Oligomeric Polyester Resin 8 (PE8)

Stage 1—HHPA, TMCD, triphenylphosphite and xylene were charged to the reaction kettle. Additional xylene was used to fill the condensate trap. The temperature was then increased from room temperature to 150° C. over two hours. Agitation was started when the melt reached 100° C. The temperature was held at 150° C. until an acid number 248 mg KOH/g resin was achieved.

Stage 2—TMP and Fascat 4100 catalyst were added to the reactor and heated to 230° C. over two and a half hours. The reaction was held at 230° C. until a final acid number of 4 mg KOH/g resin, was achieved. The resin was cooled to 110° C. and adjusted to 75 weight percent solids with n-butyl acetate. It was then poured through a medium mesh paint filter into a metal paint can.

Oligomeric Polyester Resin Properties

The acid number (abbreviated "AN"), hydroxyl number (abbreviated "OHN"), number average molecular weight (abbreviated "Mn"), weight average molecular weight (abbreviated "Mw"), molecular weight distribution polydispersity index (abbreviated "Mw/Mn"), and glass transition temperature (abbreviated "Tg") of the polyesters are shown in Tables 1.

Acid number was determined using ASTM method D 1639.

Hydroxyl number was determined by esterifying the resin by reaction with excess acetic anhydride in pyridine and then decomposing the unreacted anhydride with water. The resulting acetic acid was then titrated with a standard solution of KOH. The number of milligrams of KOH, which are equivalent to one gram of resin sample, is reported as the hydroxyl number.

Molecular weight was determined by gel permeation chromatography using a refractive index detector with polystyrene standards.

Residual solvent remaining in the resin from solvent processing could artificially lower the Tg measurement. To obtain a more accurate Tg, a resin sample was first subjected to preconditioning in an oven. About 0.3 g of the resin was placed into a small aluminum weighing pan and heated for one hour at 110° C. A sample was then transferred to a differential scanning calorimeter (TA Instruments DSC Q2000 V24.9 Build 121). On the first heating cycle, the sample was heated under nitrogen atmosphere from −50° C. to 140° C. at a rate of 20° C./min. The sample was then quench cooled to −50° C. For the second heating cycle, the sample was heated under the same conditions as those used in the first heating cycle. The midpoint of the second heating cycle is reported as the Tg of the sample.

TABLE 1

Oligomeric polyester resin charge weights (Grams) and determined resin properties

| Polyester Resin | PE 1 | PE 2 | PE 3 | PE 4 | PE 5 | PE 6 | PE 7 | PE 8 |
|---|---|---|---|---|---|---|---|---|
| Stage 1 | | | | | | | | |
| TMCD[a] | 293.91 | — | — | 293.91 | 377.40 | 271.21 | 357.43 | 397.03 |
| NPG[b],[c] | — | 535.82 | 290.75 | — | — | — | 258.14 | — |
| TMP[d] | — | — | — | — | — | 129.48 | 205.96 | — |
| HHPA[e] | 570.98 | 598.22 | 860.71 | 570.98 | 496.10 | 631.44 | — | 810.36 |
| AD[f] | — | — | — | — | 348.30 | 322.30 | 1017.39 | — |
| Triphenylphosphite | 1.96 | 1.97 | 1.90 | 1.91 | 1.94 | 1.85 | 2.04 | 1.89 |
| Fascat 4100 catalyst[g] | — | — | — | — | 1.94 | — | 0.51 | — |
| Xylene process solvent | 39.19 | — | — | 38.19 | — | 46.19 | 51.12 | 47.37 |
| Stage 2 | | | | | | | | |
| NPG | 283.70 | — | — | 283.70 | — | 363.76 | — | — |
| TMP | 205.07 | 203.82 | 749.04 | 205.07 | 719.04 | 129.48 | 205.96 | 705.23 |
| AD | 400.92 | 427.78 | — | 400.92 | — | — | — | — |
| Fascat 4100 catalyst | 1.96 | 1.97 | 1.90 | 1.91 | — | 1.85 | — | 1.89 |
| Stage 3 | | | | | | | | |
| TMP | 205.07 | 203.82 | — | 205.07 | — | — | — | — |
| Total Charge (solids only) | 1959.65 | 1969.45 | 1900.50 | 1959.65 | 1940.04 | 1847.67 | 2044.87 | 1898.40 |
| Minus Theo. Condensate | 159.65 | 169.45 | 100.50 | 159.65 | 140.85 | 147.67 | 244.87 | 94.62 |
| Yield (solids only) | 1800.00 | 1800.00 | 1800.00 | 1800.00 | 1800.00 | 1700.00 | 1800.00 | 1803.78 |
| Determined Resin Properties | | | | | | | | |
| AN, mg KOH/g resin | 9 | 9 | 2 | 5 | 2 | 4 | 4 | 2 |
| OHN, mg KOH/g resin | 192 | 190 | 330 | 172 | 275 | 148 | 160 | 304 |
| $M_w$ | 5076 | 5293 | 1684 | 3914 | 4073 | 6971 | 21083 | 1988 |
| $M_n$ | 1465 | 1471 | 904 | 1416 | 1332 | 1824 | 2019 | 1016 |
| $M_w/M_n$ | 3 | 4 | 2 | 3 | 3 | 4 | 10 | 2 |
| $T_g$, °C. | −13 | −17 | 7 | 24 | 3 | 8 | −30 | 22 |

[a] 2,2,4,4-tetramethyl-1,3-cyclobutanediol (Eastman)
[b] 2,2-Dimethyl-1,3-propanediol (Eastman)
[c] Add 1 wt. % glycol excess based on charge weight
[d] Trimethylolpropane (Perstorp)
[e] Hexahydrophthalic anhydride (Dixie Chemical)
[f] Adipic acid (Ascend Performance Materials)
[g] Butylstannoic acid (PMC Organometallix)

Thermosetting Preparation and Evaluation
Preparation of 2K Clear Coats

Both example and comparative 2K clear coats Part A were prepared by mixing the ingredients listed in Table 2. Oligomeric polyester resin samples prepared in Table 1 were pre-dissolved into n-Butyl Acetate to form 75% solid solutions. The Part A and Part B were mixed together just before applying the film. Amounts of solvents, four parts of n-Butyl Acetate and one part of PM Acetate by weight, were adjusted to achieve desired formulation solids of 40 weight %.

TABLE 2

| 2K clear coat formulations | | | | | | |
|---|---|---|---|---|---|---|
| | Example CC1 | Example CC 2 | Example CC 3 | Example CC 4 | Example CC 5 | Example CC 6 |
| Part A | | | | | | |
| PE 1 | 100 | — | 50 | — | — | — |
| PE 2 | — | 100 | 50 | — | — | — |
| PE 6 | — | — | — | 30 | 10 | 40 |
| PE 7 | — | — | — | — | — | 20 |
| PE 8 | — | — | — | 70 | 90 | 40 |
| DBTDL | 0.19 | 0.19 | 0.19 | 0.22 | 0.23 | 0.20 |
| Acetylacetone | 0.32 | 0.32 | 0.32 | 0.36 | 0.38 | 0.33 |
| N-Butyl Acetate | 132 | 132 | 132 | 153 | 163 | 139 |
| PM Acetate | 33 | 33 | 33 | 38 | 41 | 35 |
| Part B | | | | | | |
| Desmodur N3300 | 52 | 52 | 52 | 69 | 78 | 57 |
| TOTAL | 318 | 316 | 317 | 361 | 382 | 331 |

| | Comparative CC 1 | Comparative CC 2 | Comparative CC 3 | Comparative CC 4 | Comparative CC 5 | Comparative CC 6 | Comparative CC 7 |
|---|---|---|---|---|---|---|---|
| Part A | | | | | | | |
| PE 3 | 100 | 50 | — | — | — | — | — |
| PE 4 | — | — | 100 | — | — | — | — |
| PE 5 | — | — | — | 100 | — | — | — |
| PE 6 | — | — | — | — | — | — | 100 |
| PE 7 | — | — | — | — | — | 100 | — |
| PE 8 | — | 50 | — | — | 100 | — | — |
| DBTDL | 0.25 | 0.25 | 0.18 | 0.22 | 0.24 | 0.18 | 0.17 |
| Acetylacetone | 0.41 | 0.40 | 0.30 | 0.37 | 0.39 | 0.30 | 0.29 |
| N-Butyl Acetate | 177 | 173 | 126 | 159 | 168 | 122 | 118 |
| PM Acetate | 44 | 43 | 31 | 40 | 42 | 30 | 29 |
| Part B | | | | | | | |
| Desmodur N3300 | 89 | 85 | 46 | 73 | 81 | 43 | 40 |
| TOTAL | 411 | 402 | 304 | 372 | 393 | 296 | 288 |

Preparation of Composite Films

The multilayer film was prepared by applying clear coats on to one major surface of a 6 mil thick elastomeric polyurethane film. Coatings were applied on a TecMaster™ lab-coater using a gravure roll. Percent solids of the clear coat solution and process conditions on TecMaster™ were adjusted to achieve final coating thickness between 5 and 15 microns. All coatings were post-cured for 15 hours at 60° C. in a convection oven to ensure complete cure before evaluation.

Test Panel Preparation

The multilayer films were installed on substrates that mimicked automotive topcoat surface. Test panels were prepared as follows: polished cold-rolled steel test panels of thickness 0.032 inch, with electrodeposit coat, top-coated with a gray primer were purchased from ACT Test Panel LLC. Panels were further coated with a commercial water borne black basecoat and hard baked before spray applying automotive grade 2K clearcoat to achieve 40 microns dry film thickness of the clearcoat. Coated panels were flashed for 10 minutes at room temperature and then cured at 140° C. for 30 minutes.

A multilayer film was hand applied on test panels with moderate application pressure. Two percent soap solution was used as application fluid. The films installed on the substrates dried at ambient conditions at least for 24 hours before testing.

Test Methods

Tensile strength at 5% strain was measured by first cutting the multilayer film into 1 inch wide strips. The strips are placed into the grips of a Mark-10 Tensile Tester with a Series 5 Force gage (50 Lbs max load) with a 2 inch separation. The film is pulled in tension at a rate of 10 inches per minute to 50% elongation. The load-displacement curve is recorded and the load/inch at 5% strain is reported. The tensile properties of the films were measured within a week after multilayer film preparation.

Resistance to Tree sap was measured using an Erichsen Model 432 gradient oven. Temperature range was set from 30° C. to 75° C. Testing was done according to DIN EN ISO 2812-5:2007-05. Temperature at which coating was permanently damaged by Tree sap is reported as Tree sap resistance.

2K Clearcoat Evaluation Results

Monomer composition of the oligomeric polyester resins and their performance in 2K clear coat are reported in Table 3.

TABLE 3

Monomer composition of oligomeric polyester resins and their performance as a 2K clear coat on a multilayer film

| 2K clear coat | NPG mole % | TMCD mole % | TMP mole % | HHPA mole % | mole % AD | OH# of Part A resin mix | Coating thickness (microns) | Tree sap resistance (° C.) | lb/in at 5% strain |
|---|---|---|---|---|---|---|---|---|---|
| Example CC 1 | 35% | 26% | 39% | 57% | 43% | 192 | 4.0 | 53 | 1.88 |
| Example CC 2 | 63% | 0% | 37% | 57% | 43% | 190 | 3.9 | 50 | 1.57 |
| Example CC 3 | 49% | 13% | 38% | 57% | 43% | 191 | 3.0 | 55 | 1.47 |
| Example CC 4 | 14% | 30% | 56% | 90% | 11% | 231 | 3.0 | 62 | 1.72 |
| Example CC 5 | 5% | 31% | 65% | 97% | 4% | 274 | 2.9 | 68 | 1.85 |
| Example CC 6 | 25% | 29% | 46% | 66% | 34% | 190 | 3.4 | 48 | 1.31 |
| Comparative CC 1 | 33% | 0% | 67% | 100% | 0% | 330 | 5.5 | 72 | 2.05 |
| Comparative CC 2 | 17% | 16% | 68% | 100% | 0% | 316 | 3.8 | 74 | 2.01 |
| Comparative CC 3 | 35% | 26% | 39% | 100% | 0% | 172 | 3.0 | 47 | 2.40 |
| Comparative CC 4 | 0% | 31% | 69% | 57% | 43% | 275 | 3.8 | 44 | 2.54 |
| Comparative CC 5 | 0% | 31% | 69% | 100% | 0% | 303 | 4.0 | 71 | 2.30 |
| Comparative CC 6 | 31% | 31% | 38% | 0% | 100% | 160 | 4.8 | 31 | 0.67 |
| Comparative CC 7 | 48% | 26% | 26% | 65% | 35% | 148 | 4.8 | 42 | 0.65 |

The compositions of the examples of the invention ("X" symbols) are shown in FIG. 1 in relation to the comparative examples ("O" symbols). The Tree Sap and load/in at 5% strain values of the examples of the invention ("X" symbols) are shown in FIG. 2 in relation to the Comparative examples ("O" symbols).

We claim:

1. A stretchable, multilayer film comprising:
a thermoplastic polyurethane substrate; and
a thermoset coating, applied to the thermoplastic polyurethane substrate, comprising the reaction product of:
i) an oligomeric polyester resin comprising the reaction product of:
a. diols or polyols comprising from about 30 to about 99 mol % trimethylolpropane and from about 1 mol % to about 70 mol % neopentyl glycol, in each case based on the total molar amount of diols and polyols reacted, and
b. dicarboxylic acids or polycarboxylic acids comprising from about 1 mol % to about 70 mol % of one or more cyclic or acyclic aliphatic acids having from 2 to 12 carbons, based on the total molar amount of dicarboxylic acids and polycarboxylic acids reacted,
wherein the oligomeric polyester resin has a glass transition temperature (Tg) of −40 to 55° C., an acid number of 0 to 15 mgKOH/g, a hydroxyl number of 100 to 370 mgKOH/g, a number average molecular weight of 500 to 10,000 mgKOH/g, and a weight average molecular weight of 1000 to 40,000; and
(ii) an aliphatic isocyanate, isocyanurate, allophanate, or biuret,
wherein the stretchable, multilayer film exhibits an elongation to break of greater than 50%, has a load/inch to stretch of less than 2 lbs/in at 5% strain when measured within a week of multilayer film preparation, and has Tree Sap resistance of greater than 45° C.

2. The stretchable, multilayer film of claim 1, wherein the oligomeric polyester resin has an acid number of 0 to 10 mgKOH/g, a hydroxyl number of 125 to 300 mgKOH/g, a number average molecular weight of 1000 to 4,000 mgKOH/g, and a weight average molecular weight of 1000 to 25,000.

3. The stretchable, multilayer film of claim 1, wherein the amount of trimethylolpropane is from about 40 to about 70 mol % and the amount of neopentyl glycol is from about 30 mol % to about 60 mol %, and the amount of one or more cyclic or acyclic aliphatic acids having from 2 to 12 carbons is from about 20 mol % to about 70 mol %.

4. The stretchable, multilayer film of claim 1, wherein the one or more cyclic or acyclic aliphatic acids having from 2 to 12 carbons comprise adipic acid.

5. The stretchable, multilayer film of claim 1, wherein the diols or polyols further comprise 2,2,4,4-tetramethyl-1,3-cyclobutanediol (TMCD).

6. The stretchable, multilayer film of claim 1, wherein the dicarboxylic acids or poly dicarboxylic acids further comprise one or more of hexahydrophthalic anhydride (HHPA) or cyclohexanedicarboxylic acid (CHDA), present in an amount from 50 mol % to 100 mol %.

7. The stretchable, multilayer film of claim 1, wherein the stretchable, multilayer film exhibits a load/inch to stretch that is greater than 1 lb/in at 5% strain and less than 2 lbs/in at 5% strain when measured within a week of multilayer film preparation, and has Tree Sap resistance from 45° C. to 70° C.

8. The stretchable, multilayer film of claim 1, wherein the thickness of the coating is from 1 to 10 microns thick.

9. The stretchable, multilayer film of claim 1, wherein the aliphatic diisocyanate is present and is selected from one or more of: methylenebis-4,4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, pentane-1,5-diisocyanate, 1,4-bis(isocyanatomethyl) cyclohexane, or a polyisocyanate.

10. The stretchable, multilayer film of claim 1, wherein the aliphatic diisocyanate is present and corresponds to one of the following structures:

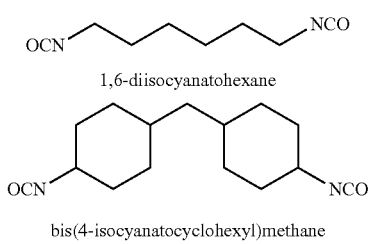

1,6-diisocyanatohexane bis(4-isocyanatocyclohexyl)methane

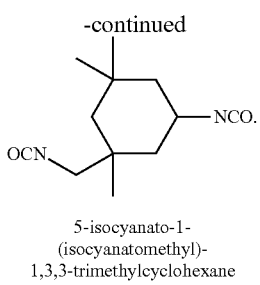

5-isocyanato-1-
(isocyanatomethyl)-
1,3,3-trimethylcyclohexane

11. The stretchable, multilayer film of claim 1, wherein the diols or polyols of the oligomeric polyester resin further comprise 2,2,4,4-tetramethyl-1,3-cyclobutanediol (TMCD), in an amount of less than 30 mol %.

12. A stretchable, multilayer film comprising:
a thermoplastic polyurethane substrate; and
a thermoset coating, applied to the thermoplastic polyurethane substrate, comprising the reaction product of:
  i) an oligomeric polyester, which is the reaction product of monomers comprising:
    a. trimethylolpropane (TMP) in an amount of 30 to 70 mole %, based on the total moles of a-c,
    b. neopentyl glycol (NPG) in an amount of 1 to 70 mole %, based on the total moles of a-c,
    c. a diol other than NPG in an amount of 0 to 69 mole %, based on the total moles of a-c,
    d. one or more cyclic or acyclic aliphatic acids having from 2 to 12 carbons in an amount of 30-100 mole %, based on the total moles of d-e, and
    e. one or more additional dicarboxylic acids in an amount of 0-70 mole %, based on the total moles of d-e,
    wherein the oligomeric polyester resin has a glass transition temperature (Tg) of −40 to 55° C., an acid number of 0 to 15 mgKOH/g, a hydroxyl number of 100 to 370 mgKOH/g, a number average molecular weight of 500 to 10,000 mgKOH/g, and a weight average molecular weight of 1000 to 25,000; and
  (ii) an aliphatic isocyanate, isocyanurate, allophanate, or biuret,
  wherein the stretchable, multilayer film exhibits an elongation to break of greater than 50%, has a load/inch to stretch of less than 2 lbs/in at 5% strain when measured within a week of multilayer film preparation, and has Tree Sap resistance of greater than 45° C.

13. The stretchable, multilayer film of claim 12, wherein the amount of trimethylolpropane is from about 40 to about 70 mol % and the amount of neopentyl glycol is from about 30 mol % to about 60 mol %, and the amount of one or more cyclic or acyclic aliphatic acids having from 2 to 12 carbons is from about 20 mol % to about 70 mol %.

14. The stretchable, multilayer film of claim 12, wherein the one or more cyclic or acyclic aliphatic acids having from 2 to 12 carbons comprises adipic acid.

15. The stretchable, multilayer film of claim 12, wherein the diols or polyols further comprise 2,2,4,4-tetramethyl-1,3-cyclobutanediol (TMCD).

16. The stretchable, multilayer film of claim 12, wherein the stretchable, multilayer film exhibits a load/inch to stretch that is greater than 1 lb/in at 5% strain and less than 2 lbs/in at 5% strain when measured within a week of multilayer film preparation, and has Tree Sap resistance from 45° C. to 70° C.

17. The stretchable, multilayer film of claim 12, wherein the thickness of the thermoset coating is from 0.1 to 25 microns thick.

18. The stretchable, multilayer film of claim 12, wherein the thickness of the coating is from 1 to 10 microns thick.

19. The stretchable, multilayer film of claim 12, wherein the aliphatic diisocyanate is present and corresponds to one of the following structures:

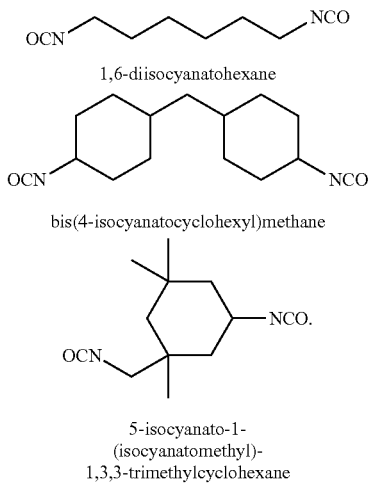

20. The stretchable, multilayer film of claim 12, wherein the oligomeric polyester resin further comprises, as a polyol, 2,2,4,4-tetramethyl-1,3-cyclobutanediol (TMCD), in an amount of less than 30 mol %.

* * * * *